United States Patent [19]

Dowty

[11] Patent Number: 4,887,860
[45] Date of Patent: Dec. 19, 1989

[54] VERTICALLY ADJUSTABLE TRAILER

[76] Inventor: Alvis E. Dowty, 4117 Renee, Jonesboro, Ark. 72401

[21] Appl. No.: 247,510

[22] Filed: Sep. 22, 1988

[51] Int. Cl.⁴ .............................................. B62D 33/08
[52] U.S. Cl. ....................................... 296/26; 296/181; 296/100; 296/104
[58] Field of Search .................... 296/26, 27, 165, 171, 296/175, 181, 98, 99.1, 100, 101, 104, 118; 105/379, 393

[56] References Cited

U.S. PATENT DOCUMENTS

| | | | |
|---|---|---|---|
| 2,656,216 | 10/1953 | Bobroff | 296/172 |
| 2,797,124 | 6/1957 | Hauptli | 296/26 |
| 2,821,428 | 1/1958 | Webster | 296/26 |
| 3,066,974 | 12/1962 | Ambli | 296/100 |
| 3,140,116 | 7/1964 | Speas | 296/100 |
| 3,160,436 | 12/1964 | Duddleston | 296/26 X |
| 3,317,239 | 5/1967 | Tantlinger | 296/100 |
| 3,319,994 | 5/1967 | Smock | 296/100 |
| 3,694,024 | 9/1972 | Linville | 296/26 |
| 4,095,838 | 6/1978 | Beeler | 296/26 |
| 4,103,958 | 8/1978 | Parent | 296/26 X |
| 4,206,943 | 6/1980 | Friedenberg | 296/26 |
| 4,392,682 | 7/1983 | Norkus, Jr. | 296/26 |
| 4,544,196 | 10/1985 | Schmeichel et al. | 296/26 |
| 4,703,971 | 11/1987 | Schmeichel et al. | 296/26 |

FOREIGN PATENT DOCUMENTS 2500738  7/1976  Fed. Rep. of Germany ........ 296/26

Primary Examiner—Dennis H. Pedder
Assistant Examiner—Andrew C. Pike
Attorney, Agent, or Firm—Shlesinger & Myers

[57] ABSTRACT

A trailer including a vertically adjustable roof which can be raised and lowered by employing pneumatic or other types of jacks disposed on the side walls of the trailer. The jacks are positioned within the housings interposed between reinforcing ribs on the side walls. The housings and the jacks may be located on the inside or outside on the walls, or the housings may be mounted on the inside and the ribs on the outside of the walls of the trailer. The jacks generally extend down to about a mid-point on the side walls and the ribs generally extend the entire vertical length of the side walls. The roof preferably may be of a mesh configuration.

31 Claims, 4 Drawing Sheets

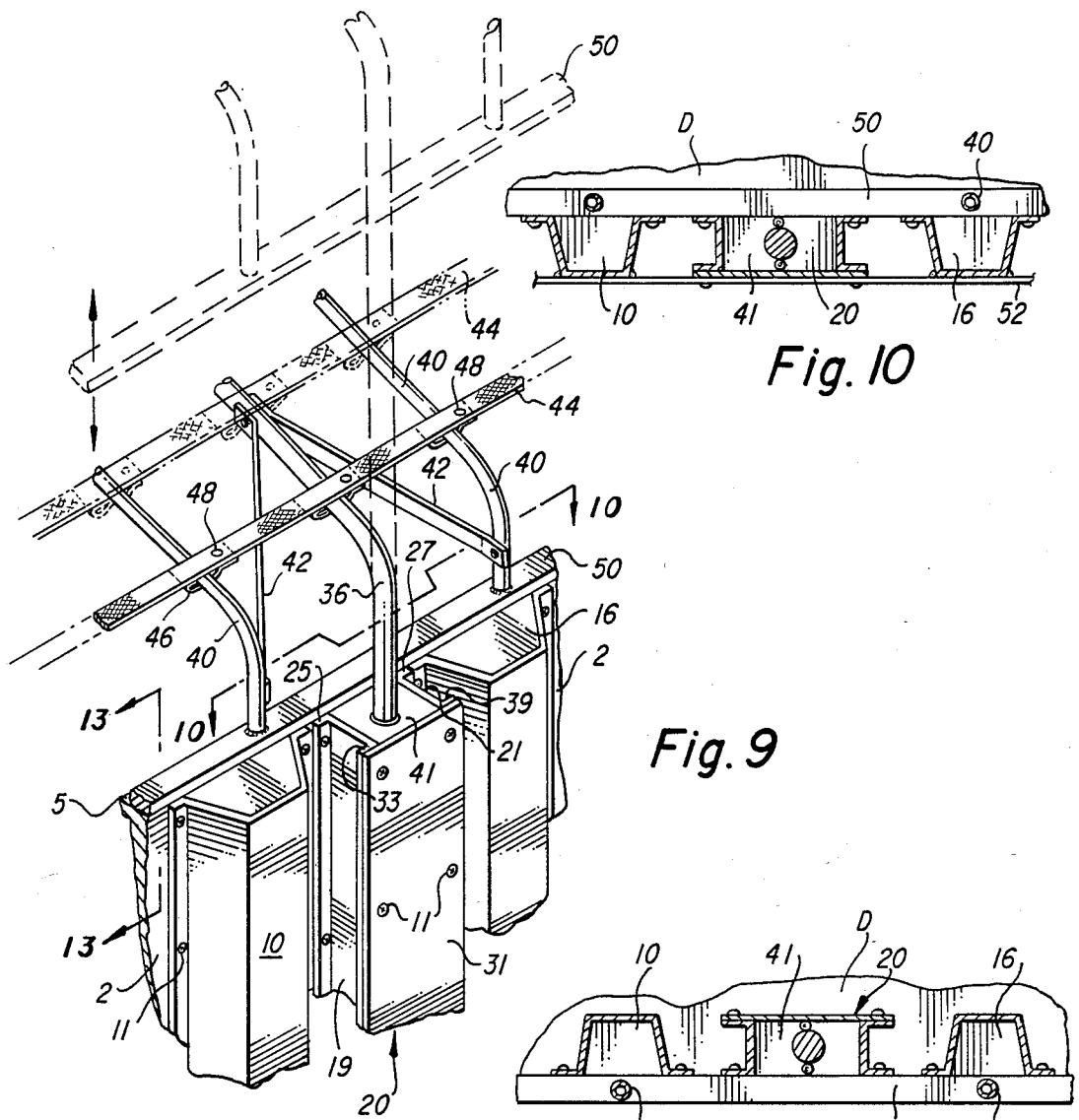
Fig. 9
Fig. 10
Fig. 11
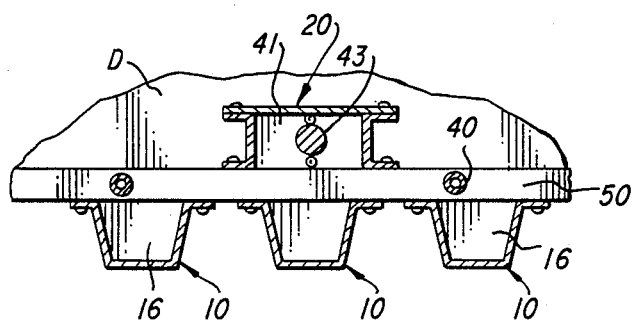
Fig. 12
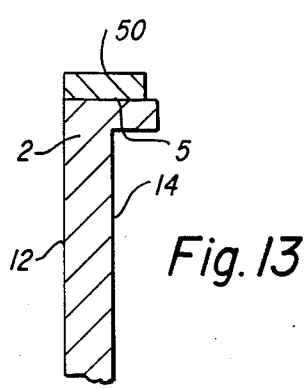
Fig. 13

VERTICALLY ADJUSTABLE TRAILER

FIELD AND HISTORICAL BACKGROUND OF THE INVENTION

The present invention is generally directed to load carrying or material handling vehicles, such as trucks, trailers, vans, railroad cars and the like. More particularly, the present invention is directed to a trailer including a vertically adjustable roof which can be raised to extra-load the cargo, and then lowered to its initial position.

The prior art is replete with various types of load carrying or material handling trailers or vehicles. Various examples of such load carrying vehicles are disclosed in U.S. Pat. Nos. 2,656,216; 2,797,124; 2,821,428; 3,140,116; 3,319,994; 3,694,024; 4,095,838; 4,206,943; 4,703,971 and 4,544,196. However, although these vehicles generally may include devices for raising and lowering the roofs thereof, they are not directed to compressing the freight without damaging it, to thereby substantially increase the cargo hauling potential. The flexible and/or resilient freight material, such as tires, generally is not damaged if compressed together during transport.

In transporting certain flexible and/or resilient or other types of freight, for example, tires, it has been observed that the freight generally has a tendency to settle several inches, and in some instances two feet or more, below the roof level in a conventional trailer, during transit. Therefore, substantial amount of space is unused and, therefore, wasted. For example, a typical truck-load of tires weighs about 30,000–35,000 lbs., and generally the overall weight limit for the tractor-trailer together with the freight is about 80,000 lbs. However, by compressing the tires together, an higher freight-load of about 45,000–50,000 lbs., may be hauled by the same tractor-trailer, thereby increasing its load carrying capacity.

Accordingly, there is a need for a material carrying or handling vehicle which is capable of transporting greater freight per load than that is which currently hauled by conventional vehicles of this type.

OBJECTS AND SUMMARY OF THE INVENTION

The principal object of the present invention is to provide a vertically adjustable trailer which is capable of carrying substantially more freight per load.

An object of the present invention is to provide a vertically adjustable trailer in which the roof can be raised, and lowered back to its initial position, thereby compressing the freight.

Another object of the present invention is to provide a vertically adjustable trailer that includes a specially designed roof which compresses the freight without damaging it.

Yet another object of the present invention is to provide a vertically adjustable trailer wherein the roof may be disconnected from the body of the trailer.

A further object of the present invention is to provide a vertically adjustable trailer which substantially minimizes the settling of the freight during transit.

Yet a further object of the present invention is to provide a vertically adjustable trailer in which a number of jacks disposed on the interior or exterior walls thereof may be interposed between reinforcing ribs, for raising or lowering the roof.

An additional object of the present invention is to provide a vertically adjustable trailer in which the jacks may be disposed on the interior surface and the reinforcing ribs may be disposed on the exterior surface, and vice-versa.

Yet an additional object of the present invention is to provide a vertically adjustable trailer in which the jacks extend from about the top of the trailer to about a midpoint on the sidewalls of the trailer to avoid damage thereto by the freight loaders, as these people frequently use heavy loading devices which inflict severe damage to the walls of the trailer. By placing the jacks substantially above the floor level, this type of damage may be avoided.

Still a further object of the present invention is to provide a vertically adjustable trailer which includes a one-piece solid roof made of a metal material.

Still another object of the present invention is to provide a vertically adjustable trailer which includes a roof of a mesh configuration.

In summary, the object of the present invention is to provide a trailer which includes a vertically adjustable roof.

BRIEF DESCRIPTION OF THE DRAWINGS

The above and other objects and advantages and novel features of the present invention will become apparent from the following detailed description of the preferred embodiment of the invention illustrated in the accompanying drawings, in which:

FIG. 9 is a partial perspective view of a fourth embodiment of the invention;

FIG. 10 is a fragmentary, enlarged cross-sectional view taken along line 10—10 of FIG. 9;

FIG. 11 is a fragmentary, enlarged cross-sectional view of a fifth embodiment of the invention similar to FIG. 10, in which the reinforcing ribs and the jacks are disposed on the inside of the trailer;

FIG. 12 is a fragmentary, enlarged cross-sectional view of a sixth embodiment of the invention similar to FIG. 10, in which the reinforcing ribs are disposed on the outside and the jacks are disposed on the inside of the trailer; and FIG. 13 is a fragmentary, enlarged cross-sectional view taken along line 13—13 of FIG. 9.

DETAILED DESCRIPTION OF THE INVENTION

Figure 1:
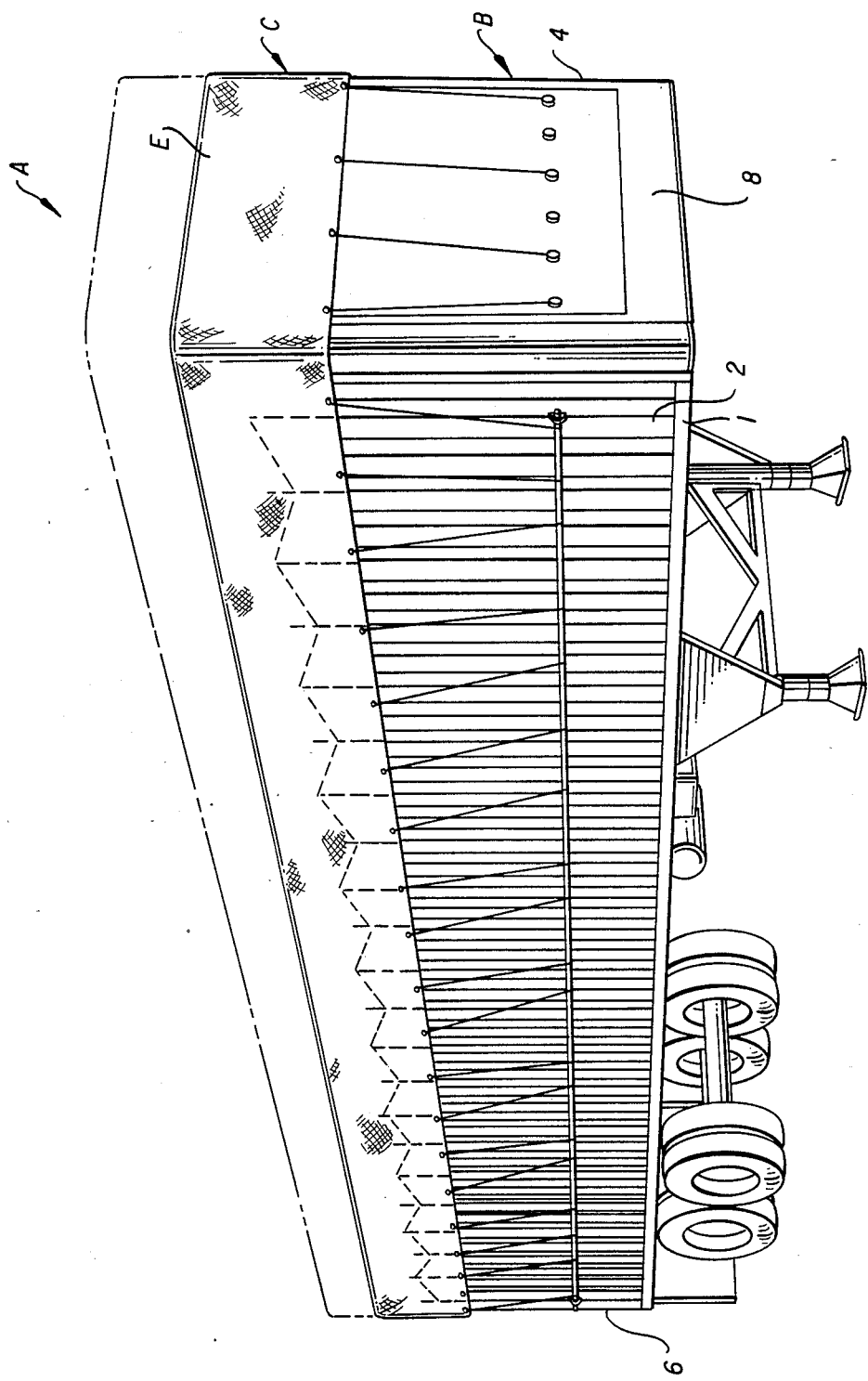
FIG. 1 is a perspective view of a trailer of the present invention.
Figure 2:
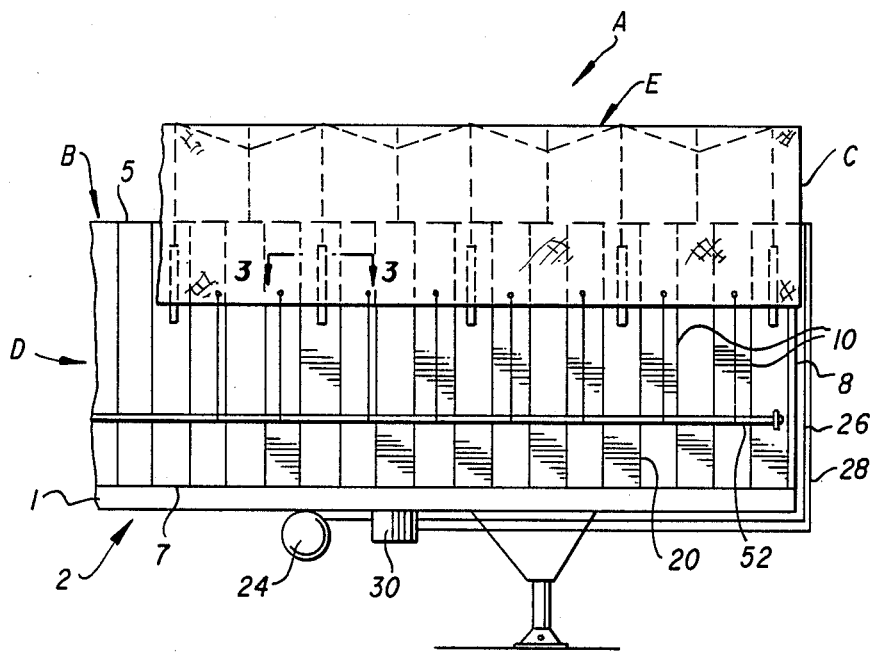
FIG. 2 is a partial elevational side view of the trailer of the present invention.

As shown in FIGS. 1 and 2, the trailer A of the present invention includes a lower body portion B, and an adjustable roof C mounted atop thereof. It should be noted that although trailer A, as depicted in the drawings, is of the kind which is generally hauled by a tractor and is particularly seen on the highways, it is well within the art to use the trailer of the present invention in association with other types of vehicles.

Figure 6:
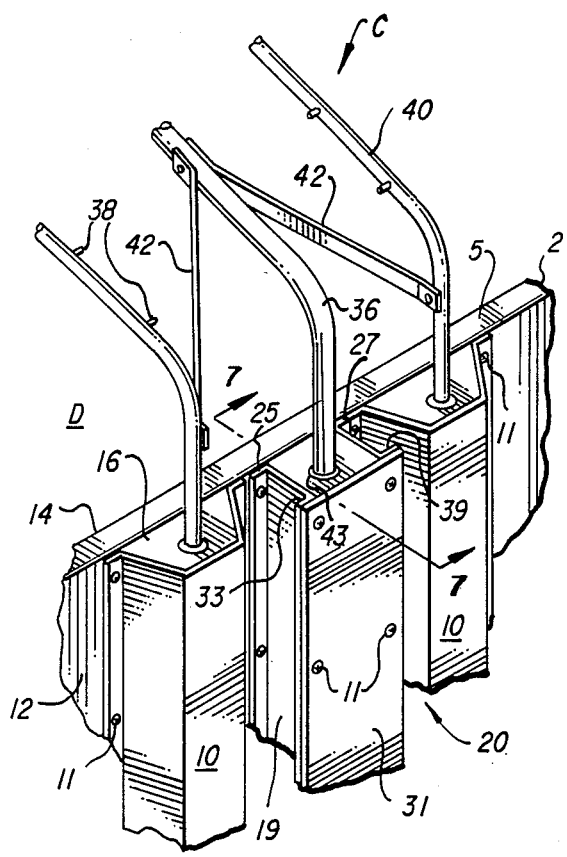
FIG. 6 is a partial perspective view of the trailer of the present invention, as shown in FIG. 3.

The body portion B is generally rectangularly shaped and includes a floor portion 1 and two laterally disposed and opposing walls 2 and 4 interconnected by two juxtaposed walls 6 and 8. The walls 2, 4, 6 and 8 extend vertically upwardly from the perimeter of floor 1 and together define a cargo or open space D (FIG. 6). Each wall 2, 4, 6 and 8 has top and bottom edges 5 and 7, respectively (FIGS. 1 and 2). (In the various embodiments described and shown herein, the like parts/components have been designated by like reference numerals.)

Figure 3:
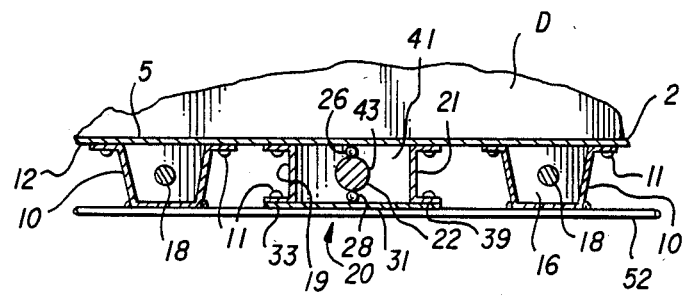
FIG. 3 is a fragmentary, enlarged cross-sectional view taken along line 3—3 of FIG. 2.
Figure 4:
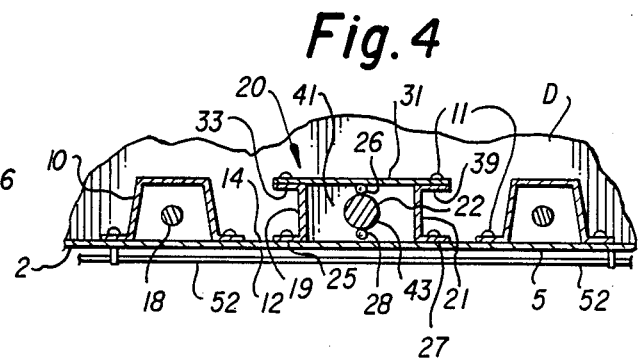
FIG. 4 is a fragmentary, enlarged cross-sectional view of a second embodiment of the invention similar to FIG. 3, in which the reinforcing ribs and the jacks are disposed on the inside of the trailer.
Figure 5:
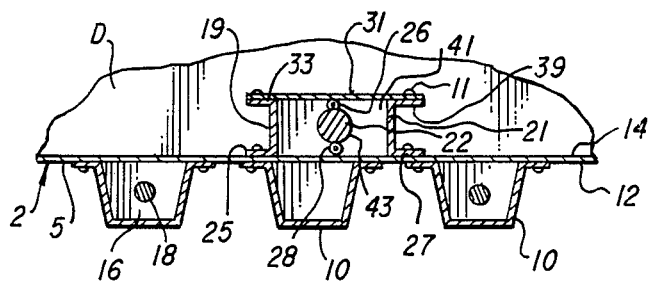
FIG. 5 is a fragmentary, enlarged cross-sectional view of a third embodiment of the invention similar to FIG. 3, in which the reinforcing ribs are disposed on the outside and the jacks are disposed on the inside of the trailer.

Each of the walls 2 and 4 includes a plurality of generally hollow, vertically extending reinforcing ribs 10 disposed on an exterior surface 12, or on an interior surface 14 thereof, shown in FIGS. 3 and 4, respectively. The ribs 10 extend from top edges 5 to bottom edges 7 of walls 2 and 4. The reinforcing ribs 10 can be made integral with the walls 2 and 4 or, preferably, may be secured onto the walls 2 or 4, by sheet metal screws 11, or other conventional fastening means. As shown in FIGS. 3-5, each rib 10 includes a plate 16 for covering a top opening thereof, and which plate 16 may include a hole 18 for receiving a portion of the roof C.

As shown in FIGS. 2-4, generally vertically extending housing 20 are interposed between ribs 10. Preferably, housing 20 are located at regular intervals of about two (2) feet. Each housing 20 consists of two vertically extending side walls 19 and 21, which are fastened at rear bent end portions thereof 25 and 27 by screws 11 or the like on the exterior surface 12 (FIG. 3), or interior surface 14 (FIG. 4), of walls 2 and 4, and define a space 29 therebetween for accommodating a pneumatic jack 22. A removable plate 31 closes space 29 and is mounted on front bent end portions 33 and 39 of side walls 19 and 21 by conventional screws or the like. Each housing 20 may further include a plate 41 or the like member for closing the top opening thereof, which, like plates 16 of ribs 10, includes a hole 43 for allowing a portion of roof C to extend therebetween.

As noted, above each housing 20 encloses therein a pneumatic double-acting jack 22 which has a piston 23 for raising or lowering roof C. An air source 24 is provided in a suitable place underneath trailer A, which supplies air to jacks 22 by two air lines 26 and 28. A control device 30 is located adjacent air source 24 for actuating the jacks 22. It should be noted that alternative devices, such as hydraulic or electrical jacks or the like, may also be used to raise or lower roof C.

In an alternative embodiment, shown in FIG. 5, the reinforcing ribs 10 may be disposed on exterior surface 12, and the jacks 22 may be disposed on the interior surface 14, of walls 2 and 4. Generally, reinforcing ribs 10 extend the entire vertical length of the laterally disposed walls 2 and 4; however, the housing 20 may either extend the entire length, or down to about a mid-point on the walls 2 and 4, as shown in FIG. 2. It should, however, be noted that regardless of whether the housings 20 extend the entire length, or down to about one-half the length of the walls 2 and 4, jacks 22 preferably extend to about a mid-point on the walls 2 and 4.

Figure 7:
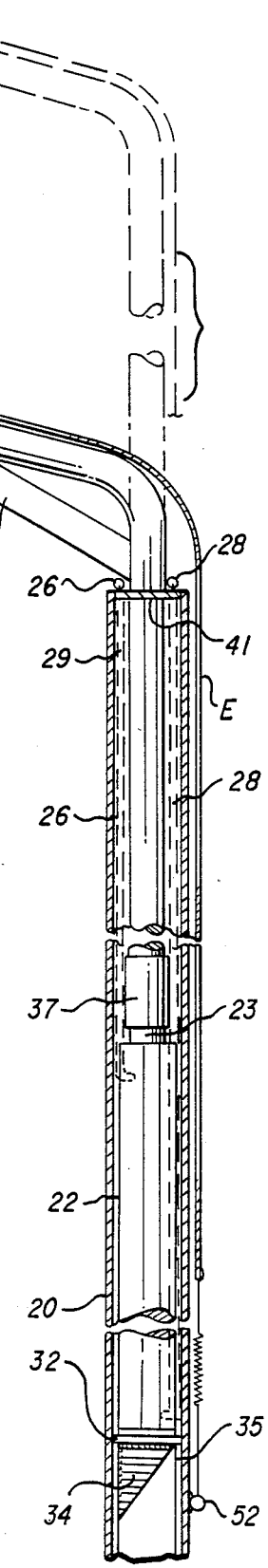
FIG. 7 is a partial, enlarged cross-sectional view taken along line 7—7 of FIG. 6 showing the jack details and showing the raised roof position in phantom lines.

As shown in FIG. 7, each jack 22 is supported on a base plate member 32 within respective housing 20. The plate member 32 is rigidly mounted in the housing 20 and is supported on a reinforced heavy load bearing stanchion 34, which is permanently mounted within a support post 35 by welding or other mechanical means. The stanchion 34 is spaced from floor 1 at about one-half the vertical length of walls 2 or 4. An external diameter of a support post 35 generally corresponds to an internal diameter of the housing 20 in order that post 35 may be slidably fitted within the housing 20. Although not shown, vertically extending removable covers may be provided for enclosing the housing 20.

Figure 8:
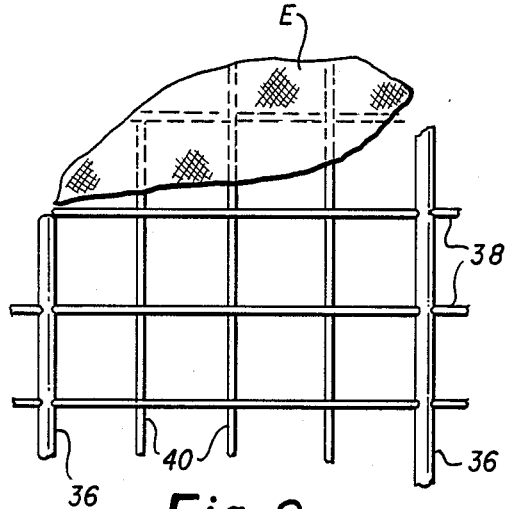
FIG. 8 is a partial, fragmentary view with a portion broken away to show generally the roof mesh of the trailer of the present invention.

The pistons 23 extending from their corresponding jacks 22 are connected with corresponding support rods 36 of the roof C. Preferably, support rods 36 are connected with pistons 23 by a coupling 37 or the like, and allow roof C to be disconnected from the lower body portion B. It should be noted that alternative means may be used for connecting rods 36 with corresponding pistons 23. As shown in FIGS. 6-8, support rods 36 extend over the entire roof C and substantially contribute to its shape and structure. The roof C, instead of being in a mesh configuration, may also be in the form of a one-piece solid design made of a rigid metal material or the like.

As shown in FIG. 8, roof C has a mesh configuration where support rods 36 extend over the entire width thereof. The roof C further includes longitudinally extending rods 38 which extend from the front to the rear of roof C and interconnect support rods 36. In addition, rods 40 extend generally parallel to support rods 36 and interconnect the longitudinally extending rods 38. Rods 40 are received into corresponding reinforcing ribs 10 adjacent the periphery of the roof C. Preferably, support rods 36 are located at regular intervals of about two (2) feet, and rods 40 running parallel thereto are located at regular intervals of about six (6) inches. Similarly, rods 38 are also, preferably, disposed at regular intervals of about six (6) inches.

As shown in FIG. 6, generally, diagonally extending cross-braces 42 connect the support rods 36 with the support rods 40. The cross-braces 42, preferably, are disposed about the peripheral area of roof C along lateral walls 2 and 4. In addition to providing strength and connecting support rods 36 with rods 40, cross-braces 42 function as a stop for roof C when it is lowered.

In the embodiment shown in FIG. 9, the longitudinally extending rods 38 are substituted by flexible strap members 44 or the like, each of which includes a flexible flap 46. Preferably, strap members are made from a nylon like material and have a width of about two (2) inches. The flaps 46 are permanently attached to flexible strap 44 at one end and are provided with snap-on type of fastening device 48 at the other end thereof. The flaps 46 are positioned at regular intervals on straps 44 at each junction thereof with support rods 36 and rods 40, and are relatively short in length. During assembly, straps 44 are spread over roof mesh C, and flaps 46 are snapped-on by the fastening device 48 after winding around corresponding rods 36 and/or 40. The length of flaps 46 is such that upon snapping-on fastening devices 48, the flaps 46 are taut around rods 36 and/or 40 and do not slip easily. In this manner, straps 44 are securely fastened to rods 36 and 40 and contribute to the overall roof mesh design.

As further shown in FIG. 9, unlike previous embodiments, rods 40 do not extend into ribs 10, but are rigidly connected to a frame-rail 50 which generally corresponds to the lower body portion B in shape and rests on the top surface of walls 2, 4, 6 and 8. Like previous embodiments, however, cross-braces 42 connect support rods 36 with rods 40, and are disposed about the peripheral area of roof C along lateral walls 2 and 4. In addition to providing strength and overall shape of roof C, frame-rail 50 further assists to limit its downward movement as it comes to rest on the top surface of walls 2, 4, 6 and 8. Preferably, six (6) jacks 22 are provided on each side of trailer A, and rods 40 are positioned at about three (3) feet from each other.

The embodiment shown in FIG. 11 is similar to the embodiment of FIG. 10, with the exception that reinforcing ribs 10 and housing 20 both are located on the interior wall surface 14 of trailer A. Similarly, in the embodiment shown in FIG. 12, reinforcing ribs 10 are located on exterior wall surface 12 and the housing 20 are located on interior wall surface 14 of trailer A.

The diameter of rods 20 has been shown to be smaller than the diameter of support rods 36, however, it may be varied to accommodate the user's specifications. In addition, rods 40 may be solid as shown in FIGS 3-6, or, may be hollow as shown in FIGS. 10-12.

In the embodiment where the roof C has a mesh structure or design, a tarp E or the like may be used to cover cargo space D. In addition, tie-rods 52 may also be disposed on the walls 2 and 4, running substantially parallel to the roof C for typing tarp E taut over roof mesh C.

Although not shown, it would be understood by those skilled in the art that mechanical or other fastening means may be provided to keep roof C down in place, during transit, as the freight, at least initially, would exert a pressure on the roof. These means may either be provided on the walls adjacent the roof, or may be associated with jacks 22.

USE AND OPERATION

In use, roof C is raised up to a desired height, preferably two-feet, by actuating jacks 22. While keeping roof C in the raised position, the entire cargo space area D, including the additional space created by raising roof C, is loaded-up with the freight, for example, tires. Once the cargo area D is completely loaded, roof C may then be lowered to its initial position. The lowering of roof C causes the freight to be compressed, but the freight itself is not damaged. If necessary, or as desired, roof C may again be raised to load even more freight in the space which may have been created by initial compressing of the freight. During transit, the space created by settling of the freight is taken up by the extra freight loaded in the area created by raising of roof C. Therefore, in effect, no or very little empty cargo space is visible at the end of the journey, and thus, the entire cargo area has been effectively used without any waste.

While this invention has been described as having a preferred design, it is understood that it is capable of further modifications, uses and/or adaptations of the invention and following in general the principle of the invention, including such departures from the present disclosure as have come within known or customary practice in the art to which the invention pertains, and as will be applied to the central features hereinbefore set forth, and fall within the scope of the invention or the limits of the claims appended hereto.

What is claimed is:
1. A vertically adjustable trailer, comprising:
   (a) a body portion including a floor and a plurality of opposing walls extending from said floor;
   (b) said walls defining an open space therebetween;
   (c) a roof adjustably mounted atop said walls for substantially covering said open space;
   (d) each of said walls having interior and exterior surfaces, and top and bottom edges;
   (e) a plurality of reinforcing ribs disposed on one of said interior and exterior surfaces of a plurality of said walls;
   (f) a plurality of generally vertically extending jack means interposed between said reinforcing ribs;
   (g) said jack means extending from about the top edge to a predetermined distance towards the bottom edge of said plurality of said walls;
   (h) said jack means being in length not more than about one-half the vertical length of one of said plurality of said walls;
   (i) said jack means operably connected with said roof for vertically adjusting a position thereof relative to said walls;
   (j) each said jack means including a reinforced high load bearing stanchion spaced about one-half the distance from said floor;
   (k) each said jack means having said stanchion mounted adjacent a bottom of said jack means;
   (l) said roof including a plurality of support members extending downwardly from a periphery thereof; and
   (m) a first set of said support members is slidably received in said ribs and a second set thereof is operably connected with said jack means so that said roof moves up or down when said jack means is actuated.
2. The trailer of claim 1, wherein:
   (a) said roof comprises a generally mesh structure.
3. The trailer of claim 2, wherein:
   (a) said mesh comprises said support members extending over said open space and interconnected by a plurality of generally longitudinally extending cross members.
4. The trailer of claim 1, wherein:
   (a) said roof includes generally diagonally extending cross-braces in a peripheral area thereof; and
   (b) said cross-braces connect said support members of said first set with said support members of said second set.
5. The trailer of claim 1, wherein:
   (a) said roof is formed of a continuous sheet of material.
6. The trailer of claim 1, wherein:
   (a) at least one of said jack means is a pneumatic jack.
7. The trailer of claim 6, wherein:
   (a) said pneumatic jack is a double-acting jack.
8. The trailer of claim 1, further comprising:
   (a) a housing for each said jack means.
9. The trailer of claim 1, further comprising:
   (a) at least one tie-rod on the external surface of each of two of said opposing walls.
10. The trailer of claim 9, wherein:
    (a) said tie-rods extend generally parallel to said roof.
11. The trailer of claim 1, wherein:

(a) said ribs extend from about the top edges to about the bottom edges of said walls.

12. The trailer of claim 1, wherein:
(a) said ribs and said jack means are disposed on the interior surface of said plurality of said walls.

13. The trailer of claim 1, wherein:
(a) said ribs and said jack means are disposed on the exterior surface of said plurality of said walls.

14. The trailer of claim 1, further comprising:
(a) means for limiting the downward movement of said roof: and
(b) said downward movement limiting means comprising cross-braces disposed adjacent the periphery of said roof.

15. The trailer of claim 1, further comprising:
(a) means for actuating said jack means.

16. A vertically adjustable trailer, comprising:
(a) a body portion including a floor and a plurality of walls extending from said floor;
(b) said walls defining an open space therebetween;
(c) a roof adjustably mounted atop said walls for substantially covering said open space;
(d) each of said walls having interior and exterior surfaces, and top and bottom edges;
(e) a plurality of reinforcing ribs disposed on one of said interior and exterior surfaces of a plurality of said walls;
(f) a plurality of generally vertically extending jack means disposed on the other of said interior and exterior surfaces of said plurality of said walls;
(g) said jack means extending from about the top edge to a predetermined distance towards the bottom edge of said plurality of said walls;
(h) said jack means being in length not more than about one-half the vertical length of one of said plurality of said walls;
(i) said jack means operably connected with said roof for vertically adjusting a position thereof relative to said walls;
(j) each said jack means including a reinforced high load bearing stanchion spaced about one-half the distance from said floor;
(k) each said jack means having said stanchion mounted adjacent a bottom of said jack means;
(l) said roof including a plurality of support members extending downwardly from a periphery thereof; and
(m) a first set of said support members is slidably received in said ribs and a second set thereof is operably connected with said jack means so that said roof moves up or down when said jack means is actuated.

17. A vertically adjustable trailer, comprising:
(a) a body portion including a floor and a plurality of opposing walls extending from said floor;
(b) said walls defining an open space therebetween;
(c) a roof adjustably mounted atop said walls for substantially covering said open space;
(d) each of said walls having interior and exterior surfaces, and top and bottom edges;
(e) a plurality of reinforcing ribs disposed on one of said interior and exterior surfaces of a plurality of said walls;
(f) a plurality of generally vertically extending jack means interposed between said reinforcing ribs;
(g) said jack means extending from about the top edge to a predetermined distance towards the bottom edge of said plurality of said walls;
(h) said jack means being in length not more than about one-half the vertical length of one of said plurality of said walls;
(i) said jack means operably connected with said roof for vertically adjusting a position thereof relative to said walls;
(j) each said jack means including a reinforced high load bearing stanchion spaced about one-half the distance from said floor;
(k) each said jack means having said stanchion mounted adjacent a bottom of said jack means;
(l) said roof including a frame-rail means corresponding in shape to said body portion;
(m) said roof including a plurality of support members; and
(n) a first set of said support members is connected to said frame-rail means and a second set of said support members is operably connected with said jack means so that said roof moves up or down when said jack means is actuated.

18. The trailer of claim 17, wherein;
(a) said roof comprises a generally mesh structure.

19. The trailer of claim 18, wherein:
(a) said mesh comprises said support members extending over said open space and interconnected by a plurality of generally longitudinally extending cross members.

20. The trailer of claim 17, wherein:
(a) said roof includes generally diagonally extending cross-braces in a peripheral area thereof; and
(b) said cross-braces connecting said support members of said first set with said support members of said second set.

21. The trailer of claim 17, wherein:
(a) at least one of said jack means is a pneumatic jack.

22. The trailer of claim 21, wherein:
(a) said pneumatic jack is a double-acting jack.

23. The trailer of claim 17, further comprising:
(a) a housing for each said jack means.

24. The trailer of claim 17, further comprising:
(a) at least one tie-rod mounted on the external surface of each of two of said opposing walls.

25. The trailer of claim 24, wherein:
(a) said tie-rods extend generally parallel to said roof.

26. The trailer of claim 17, wherein:
(a) said ribs extend from about the top edges to about the bottom edges of said walls.

27. The trailer of claim 17, wherein:
(a) said ribs and said jack means are disposed on the interior surface of said plurality of said walls.

28. The trailer of claim 17, wherein:
(a) said ribs and said jack means are disposed on the exterior surface of said plurality of said walls.

29. The trailer of claim 17, further comprising:
(a) means for limiting the downward movement of said roof; and
(b) said downward movement limiting means comprising said top edges of said walls, wherein when said roof is moved downwardly said frame-rail means comes to rest on said top edges.

30. The trailer of claim 17, further comprising: (a) means for actuating said jack means.

31. A vertically adjustable trailer, comprising:
(a) a body portion including a floor and a plurality of walls extending from said floor;
(b) said walls defining an open space therebetween;
(c) a roof adjustably mounted atop said walls for substantially covering said open space;

(d) each of said walls having interior and exterior surfaces, and top and bottom edges;

(e) a plurality of reinforcing ribs disposed on one of said interior and exterior surfaces of a plurality of said walls;

(f) a plurality of generally vertically extending jack means disposed on the other of said interior and exterior surfaces of said plurality of said walls;

(g) said jack means extending from about the top edge to a predetermined distance towards the bottom edge of said plurality of said walls;

(h) said jack means being in length not more than about one-half the vertical length of one of said plurality of said walls;

(i) said jack means operably connected with said roof for vertically adjusting a position thereof relative to said walls;

(j) each said jack means including a reinforced high load bearing stanchion spaced about one-half the distance from said floor;

(k) each said jack means having said stanchion mounted adjacent a bottom of said jack means;

(l) said roof including a frame-rail means corresponding in shape to said body portion;

(m) said roof including a plurality of support members and (n) a first set of said support members is connected to said frame-rail means and a second set of said support members is operably connected with said jack means so that said roof moves up or down when said jack means is actuated.

* * * * *